US010979599B2

(12) United States Patent
Totsuka et al.

(10) Patent No.: US 10,979,599 B2
(45) Date of Patent: Apr. 13, 2021

(54) IMAGE FORMING APPARATUS TO DETERMINE USER AUTHENTICATION REGARDING A FACSIMILE DOCUMENT

(71) Applicant: CANON KABUSHIKI KAISHA, Tokyo (JP)

(72) Inventors: Satoshi Totsuka, Tsukuba (JP); Akinori Takeo, Yokohama (JP); Masahiro Mutsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/693,094

(22) Filed: Aug. 31, 2017

(65) Prior Publication Data
US 2018/0084153 A1 Mar. 22, 2018

(30) Foreign Application Priority Data
Sep. 20, 2016 (JP) .............................. JP2016-182649

(51) Int. Cl.
*H04N 1/00* (2006.01)
*H04N 1/44* (2006.01)
(Continued)

(52) U.S. Cl.
CPC ......... *H04N 1/4413* (2013.01); *G06F 3/1203* (2013.01); *G06F 3/1236* (2013.01); *G06F 3/1238* (2013.01); *G06F 3/1271* (2013.01); *G06F 3/1284* (2013.01); *G06F 21/31* (2013.01); *G06F 21/608* (2013.01); *G06Q 20/145* (2013.01); *G06Q 20/18* (2013.01); *G07F 17/266* (2013.01); *H04N 1/00411* (2013.01); *H04N 1/4433* (2013.01); *H04N 2201/0094* (2013.01)

(58) Field of Classification Search
CPC .......................... H04N 1/4413; H04N 1/4433
See application file for complete search history.

(56) References Cited

U.S. PATENT DOCUMENTS 7,151,613 B1 * 12/2006 Ito ........................ G06F 3/1222
358/1.15
2004/0196491 A1 * 10/2004 Uchino ................. G06F 21/608
358/1.15
(Continued)

FOREIGN PATENT DOCUMENTS

| JP | 11-258954 A | 9/1999 |
| JP | 2004-080330 A | 3/2004 |
| JP | 2009-171331 A | 7/2009 |

*Primary Examiner* — Benjamin O Dulaney
(74) *Attorney, Agent, or Firm* — Canon U.S.A., Inc. I.P. Division

(57) ABSTRACT

An image forming apparatus includes a receiving unit, a storage unit, a login state determination unit, and a control unit. The receiving unit receives a facsimile-received document via a network. The storage unit stores the facsimile-received document received by the receiving unit in a reception box. The login state determination unit determines whether a user to be charged is logged in, a user who does not need to be charged is logged in, or no user is logged in. The control unit controls the storage unit to store the facsimile-received document in the reception box instead of outputting the facsimile-received document when the receiving unit receives the facsimile-received document and if the login state determination unit determines that no user is logged in or a user to be charged is logged in.

10 Claims, 7 Drawing Sheets

(51) Int. Cl.
  *G06F 21/31*   (2013.01)
  *G06Q 20/14*   (2012.01)
  *G06Q 20/18*   (2012.01)
  *G06F 3/12*    (2006.01)
  *G06F 21/60*   (2013.01)
  *G07F 17/26*   (2006.01)

(56) References Cited

U.S. PATENT DOCUMENTS

| | | | | |
|---|---|---|---|---|
| 2005/0225791 | A1* | 10/2005 | Lee | G06F 21/608 |
| | | | | 358/1.14 |
| 2007/0086046 | A1* | 4/2007 | Kim | G06F 21/608 |
| | | | | 358/1.15 |
| 2010/0064363 | A1* | 3/2010 | Kano | G06F 21/608 |
| | | | | 726/19 |
| 2010/0321716 | A1* | 12/2010 | Takeo | G06F 3/121 |
| | | | | 358/1.14 |
| 2012/0154848 | A1* | 6/2012 | Fukudome | G06F 3/1204 |
| | | | | 358/1.14 |
| 2013/0201524 | A1* | 8/2013 | Yamamoto | G06F 3/12 |
| | | | | 358/1.15 |
| 2014/0053232 | A1* | 2/2014 | Coles | G06F 21/6209 |
| | | | | 726/1 |
| 2015/0026782 | A1* | 1/2015 | Nishida | H04L 63/08 |
| | | | | 726/6 |
| 2015/0082254 | A1* | 3/2015 | Ohba | G06F 9/453 |
| | | | | 715/856 |
| 2017/0075635 | A1* | 3/2017 | Maemura | H04N 1/00244 |
| 2017/0279997 | A1* | 9/2017 | Ozawa | H04N 1/00925 |
| 2018/0004466 | A1* | 1/2018 | Nakajima | G06F 3/1267 |

* cited by examiner

IMAGE FORMING APPARATUS TO DETERMINE USER AUTHENTICATION REGARDING A FACSIMILE DOCUMENT

BACKGROUND OF THE INVENTION

Field of the Invention

The present disclosure relates to an image forming apparatus having a facsimile receiving function, a control method of an image forming apparatus, and a program.

Description of the Related Art

There has been proposed a mechanism for an image forming apparatus that is installed at a public facility, such as a convenience store, and that makes use of a coin collecting device connected to the image forming apparatus so that a user can pay a fee charged by the image forming apparatus to use a copy function. However, each time an owner or an employee uses such an image forming apparatus provided with a coin collecting device, the function of the coin collecting device must be switched off to circumvent the charge collection function.

In order to improve usability of such an image forming apparatus, a form of operation called "half public" is increasing. In particular, in a tutoring school, for example, a single image forming apparatus in which students log in to the image forming apparatus via a coin collecting device and employees log in to the image forming apparatus via an operation unit without using a coin collecting device is being used effectively. Japanese Patent Laid-Open No. 11-258954 describes an image forming apparatus which has a charge collection function and in which a charging management mode (for general users) and a non-charging management mode (for administrators and service engineers) can be switched between.

Further, a mechanism in which an image forming apparatus with an effective charge collection function can receive and print a facsimile at no charge has also been proposed.

However, in an environment in which a half public operation is conducted, a facsimile-received document may be printed directly. In this case, since anyone can view and remove the facsimile-received document, there is an issue that highly confidential document may be exposed.

SUMMARY OF THE INVENTION

An image forming apparatus having features of the present disclosure prevents exposure of confidential information in a facsimile-received document in an environment where an image forming apparatus is used in a half public operation mode.

According to an aspect of the present invention, an image forming apparatus includes a receiving unit configured to receive a facsimile-received document via a network, a storage unit configured to store the facsimile-received document received by the receiving unit in a reception box, a login state determination unit configured to determine whether a user to be charged is logged in, a user who does not need to be charged is logged in, or no user is logged in, and a control unit configured to control the storage unit to store the facsimile-received document in the reception box instead of outputting the facsimile-received document when the receiving unit receives the facsimile-received document and if the login state determination unit determines that no user is logged in or a user to be charged is logged in.

Further features of the present invention will become apparent from the following description of embodiments with reference to the attached drawings.

DESCRIPTION OF THE EMBODIMENTS

Hereinafter, embodiments for implementing the present disclosure will be described with reference to the drawings. In an example, when a facsimile-received document is received in a state in which no user is logged in an image forming apparatus or a state in which a visitor is using the image forming apparatus, a facsimile-received document is stored in a reception box. When an employee who can use the image forming apparatus free of charge logs in, printing of the facsimile-received document stored in the reception box is started.

Figure 1:
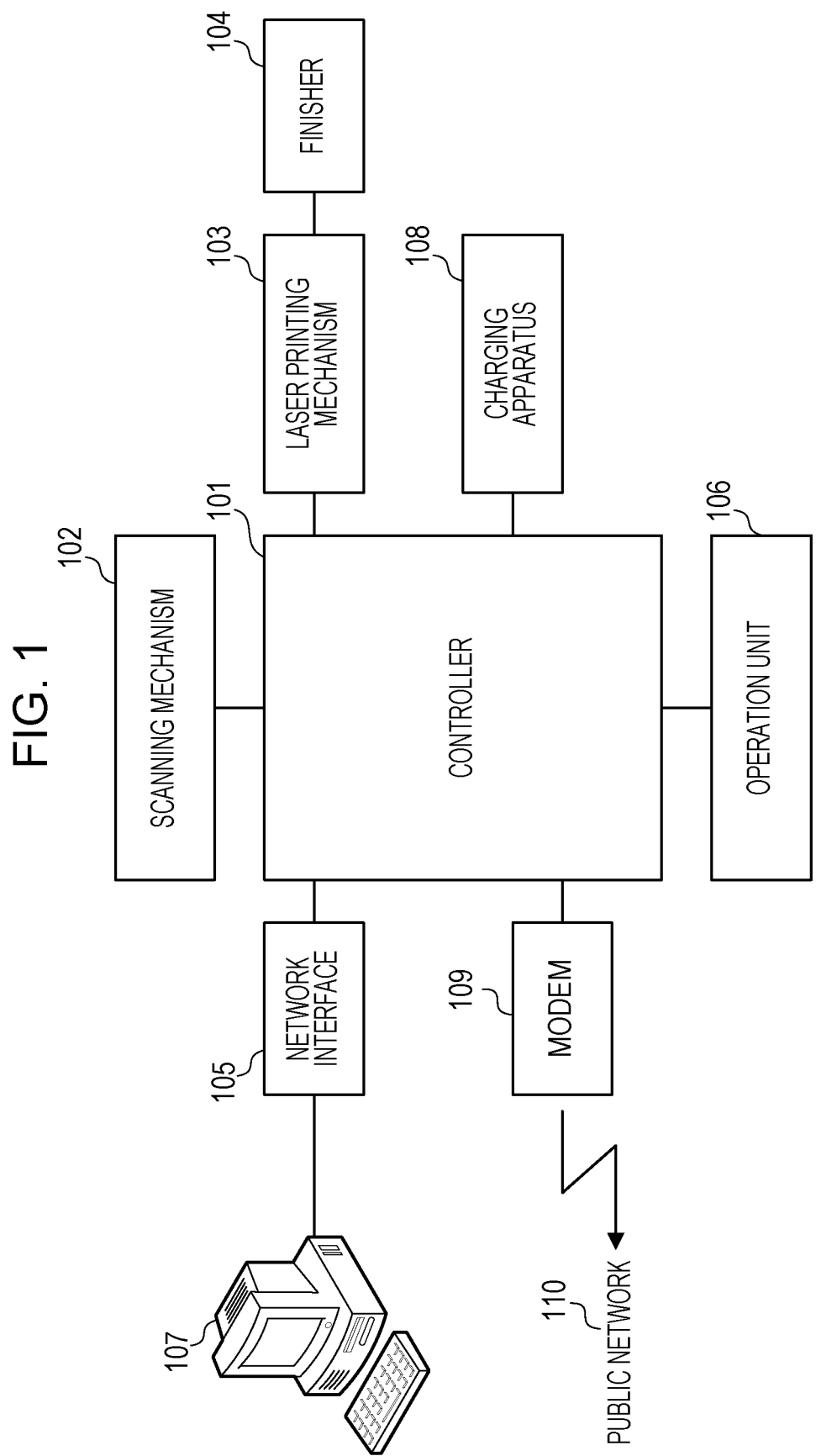
FIG. 1 illustrates an entire configuration of an image forming apparatus.

FIG. 1 illustrates a configuration of a multi-function peripheral (MFP) as an example of an image forming apparatus as an embodiment of the present disclosure.

Figure 2:
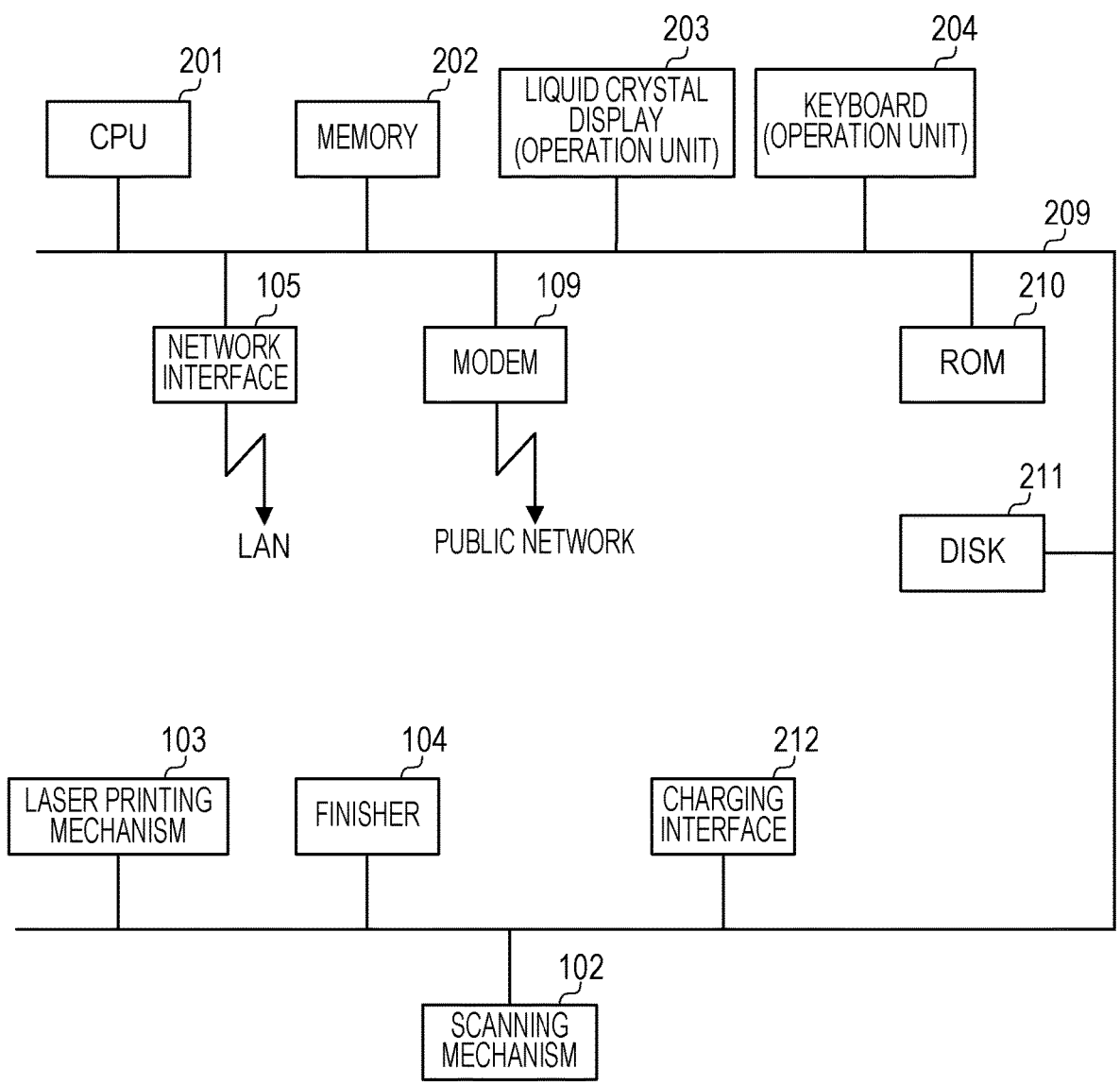
FIG. 2 illustrates an entire configuration of an image forming system.

In FIG. 1, the reference numeral 101 denotes a controller for controlling the MFP. The hardware configuration of the controller for controlling the MFP is illustrated in FIG. 2. The reference numeral 102 denotes a scanning mechanism which is controlled by the controller 101. The reference numeral 103 denotes a laser printing mechanism which is controlled by the controller 101.

The laser printing mechanism 103 is connected to a finisher 104. The finisher 104 is capable of collectively stapling a plurality of recording media (for example, paper sheets) output from the printing mechanism 103. The finisher 104 also is controlled by the controller 101.

The reference numeral 105 denotes a network (e.g., Ethernet (registered trademark)) interface which provides the controller 101 with two-way communication. The controller 101 is connectable to a personal computer 107 via the network. The reference numeral 109 denotes a MODEM connected to a public network 110. The controller 101 inputs and outputs image information via the MODEM 109.

The reference numeral 106 denotes an operation unit which is constituted by a liquid crystal display and a keypad. The operation unit 106 displays information from the controller 101 and transmits instructions from a user to the controller 101. Any apparatuses connected to the network (e.g., Ethernet (registered trademark), TCP/IP) may use all the functions of the operation unit 106.

The reference numeral 108 denotes a charging apparatus for collecting a fee charged to the user of the apparatus. The charging apparatus 108 of the MFP may be externally provided.

FIG. 2 illustrates a hardware configuration of the controller 101 of the present embodiment illustrated in FIG. 1. Inside the controller 101, a CPU 201 is connected to memory 202, a liquid crystal display 203, and a keypad 204, which constitute the operation unit 106, ROM 210, and a DISK 211 via a bus 209.

Various programs and various types of data are stored on the DISK 211 (a storage medium), such as a hard disk, and are sequentially loaded into the memory 202 and processed by the CPU 201 as necessary. The DISK 211 may be removably attached to the MFP or may be built into the MFP.

The programs may be downloaded from another MFP via a network and stored on the DISK 211.

The types of memory include volatile memory, such as DRAM, and nonvolatile memory, such as SRAM. The memory 202 may have functions of both types of volatile and nonvolatile memory, or the memory 202 may have a function of volatile memory only, and the DISK 211 may have a function of nonvolatile memory. The physical medium of the memory, and so forth, may be a removable memory medium.

The liquid crystal display 203 and the keypad 204 constitute the operation unit 106 illustrated in FIG. 1. When the CPU 201 writes data to the liquid crystal display 203, the data is displayed and, when the CPU 201 reads data that is displayed on the liquid crystal display 203 after being received from the keypad 204 or a touch panel, instructions from the user are input.

The input information is transferred to any of the memory 202, the DISK 211, and the CPU 201, accumulated, and used for various types of processing.

The network interface 105 is connected to the bus 209. The CPU 201 communicates with an external device by receiving data from or sending data to the network interface 105.

The MODEM 109 is connected to the bus 209. The CPU 201 transmits and receives image data via a public network by using the MODEM 109.

A charging interface 212 is connected to the bus 209 to allow connection of the charging apparatus 108 illustrated in FIG. 1. The CPU 201 performs communication for charge collection by reading or writing data of the balance and so forth to or from the charging interface 212.

The laser printing mechanism 103, the finisher 104, and the scanning mechanism 102 are connected to the bus 209. The CPU 201 performs operations, such as printing and scanning, and acquisition of various statuses by reading and writing data with respect to the printing and scanning mechanisms.

The image data can be input from the scanning mechanism 102 or the network interface 105 and stored on the DISK 211 and in the memory 202 in the controller 101.

Further, the image data may be stored on removable memory in advance and read from the memory when the memory is attached to the controller 101.

The printer, the finisher, and the scanner may be provided alone as peripheral devices of the MFP on the network and controlled by the controller 101 of the MFP instead of being built into the MFP.

Overview of MFP

Figure 3:
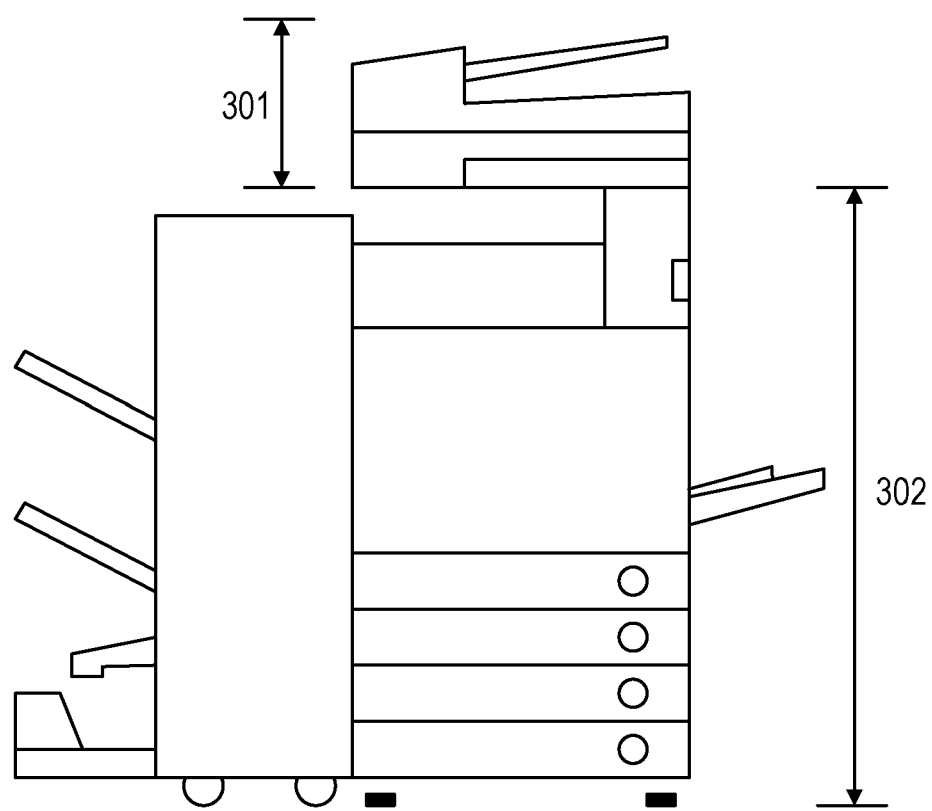
FIG. 3 is an external view of the image forming apparatus.

FIG. 3 schematically illustrates the MFP. A scanner unit 301, which is an image input device, illuminates an image on a paper sheet as a document, and paper sheet is then scanned by a CCD linear sensor. Next, the image on the document in the scanner unit 301 is converted into image data. The image data converted from the image is then subjected to color determination, size determination, and so forth.

The printer unit 302 which is an image output device prints the image data on the paper sheet and performs binding processing, such as stapling and folding. Starting and stopping a print operation are performed in accordance with instructions from the CPU 201 of the controller 101.

Configuration of Operation Unit

Figure 4:
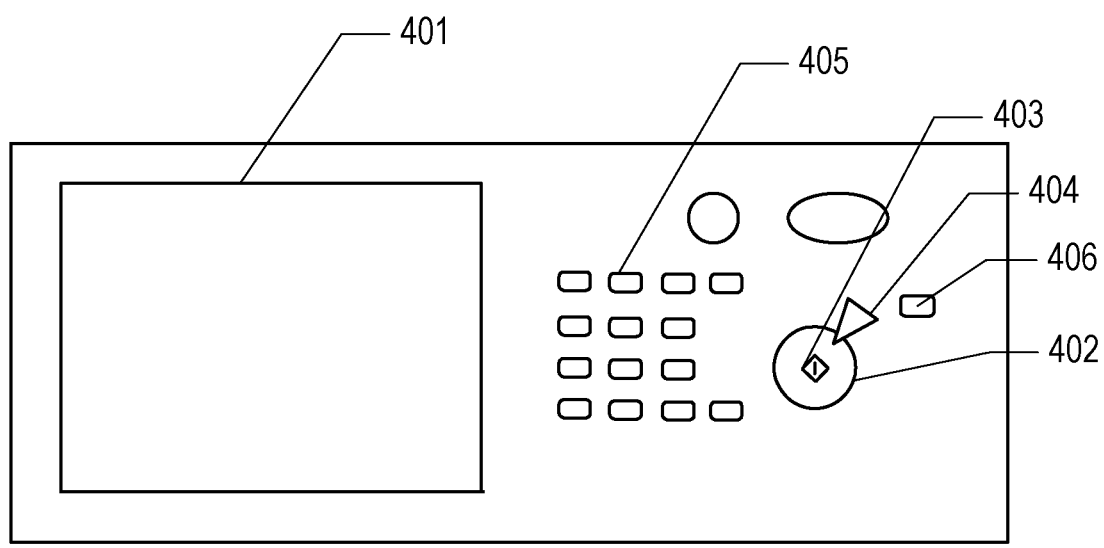
FIG. 4 is a detailed view of an operation unit device of the image forming apparatus.

FIG. 4 illustrates a configuration of the operation unit 106. A liquid crystal display unit 401 is formed by attaching a touch panel sheet to a liquid crystal display. The liquid crystal display unit 401 displays an operation screen of the system and soft keys. When the displayed keys are pressed, position information of the keys is transferred to the CPU 201 of the controller 101.

A start key 402 is used to start a reading operation of a document image, for example. A bi-color LED lamp 403 of green and red is provided in the central portion of the start key 402. The color of the bi-color LED lamp 403 indicates usability of the start key 402. A stop key 404 is used to stop a current operation. A numeric keypad 405 is constituted by a button group of numbers and characters and is used to set the number of copies and switch screens of the liquid crystal display unit 401. A user mode key 406 is pressed when performing equipment setting.

Login Screen

Figure 5:
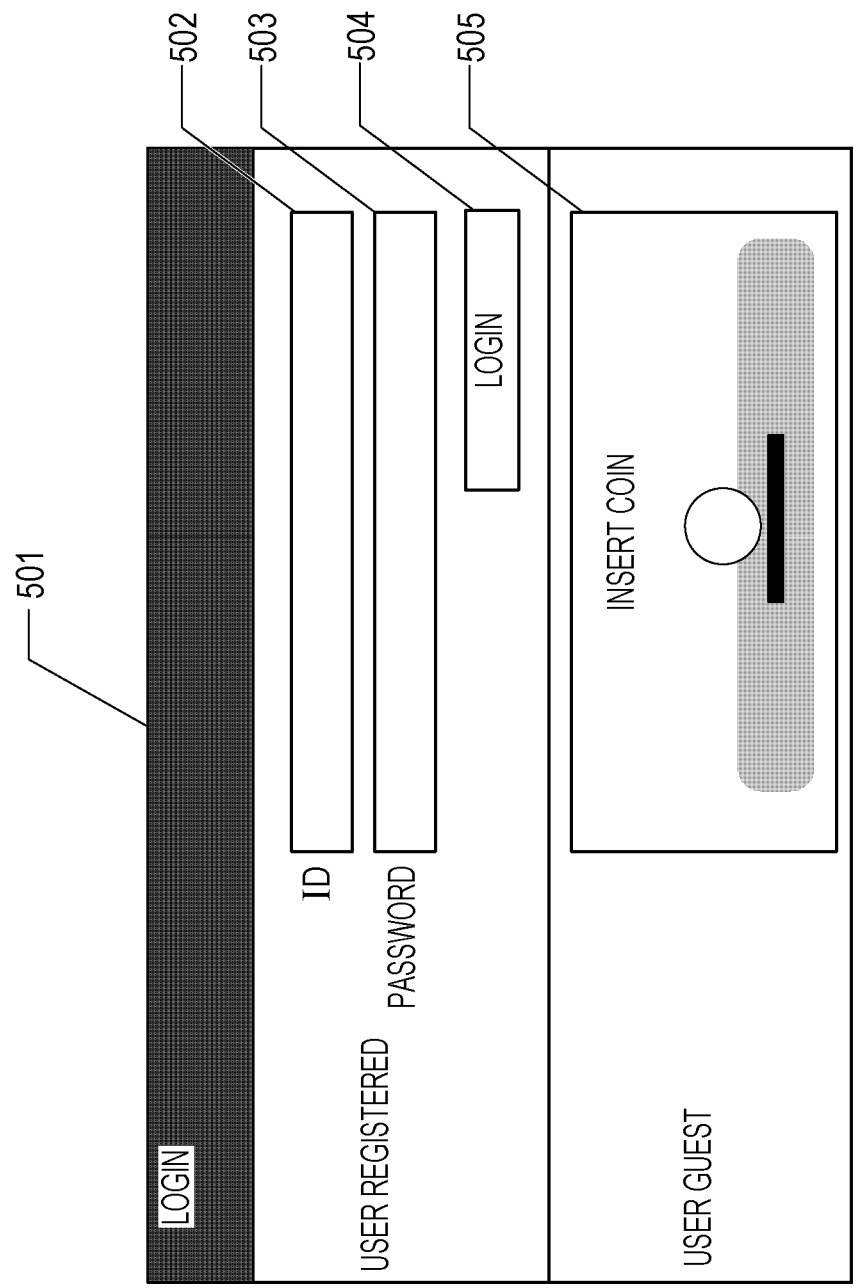
FIG. 5 illustrates an operation unit screen of the image forming apparatus.

FIG. 5 is an example of a login screen displayed on the liquid crystal display unit 401 in accordance with instructions from the CPU 201 of the controller 101. On the login screen 501, an ID input box 502 and a password input box 503 that prompt a user associated with an ID to enter the ID and a password, and a login button 504 are displayed. A solution screen 505 for a user who is not associated with an ID also is displayed on the same login screen 501.

Either or both of the memory 202 and the DISK 211 of the controller 101, store data as illustrated in Table 1. When the ID input into the ID input box 502 and the password input into the password input box 503 match the data of Table 1 stored in the memory 202 or on the DISK 211, the user is authenticated and allowed to log in to the image forming apparatus. The user who logged in through this authentication is defined as a "registered user".

When a coin is inserted into the charging apparatus, the user can log in. In this case, login is allowed without the need to input a password. In this case, in the present embodiment, the ID is "Coin" which is recognized as an ID different from an ordinary ID. The user who logged in through this authentication is defined as a "guest user".

TABLE 1

| | ID | PASSWORD |
|---|---|---|
| 1 | Admin | abcd |
| 2 | Asan | cdef |
| 3 | Bsan | aaaa |
| 4 | Coin | NONE |

To log off, a logged in user presses a logout button displayed on the liquid crystal display unit 401 which is not illustrated. Alternatively, the user may be automatically logged out when a previously determined auto-logout time in which no operation is performed has elapsed.

Facsimile Reception Flow

Figure 6:
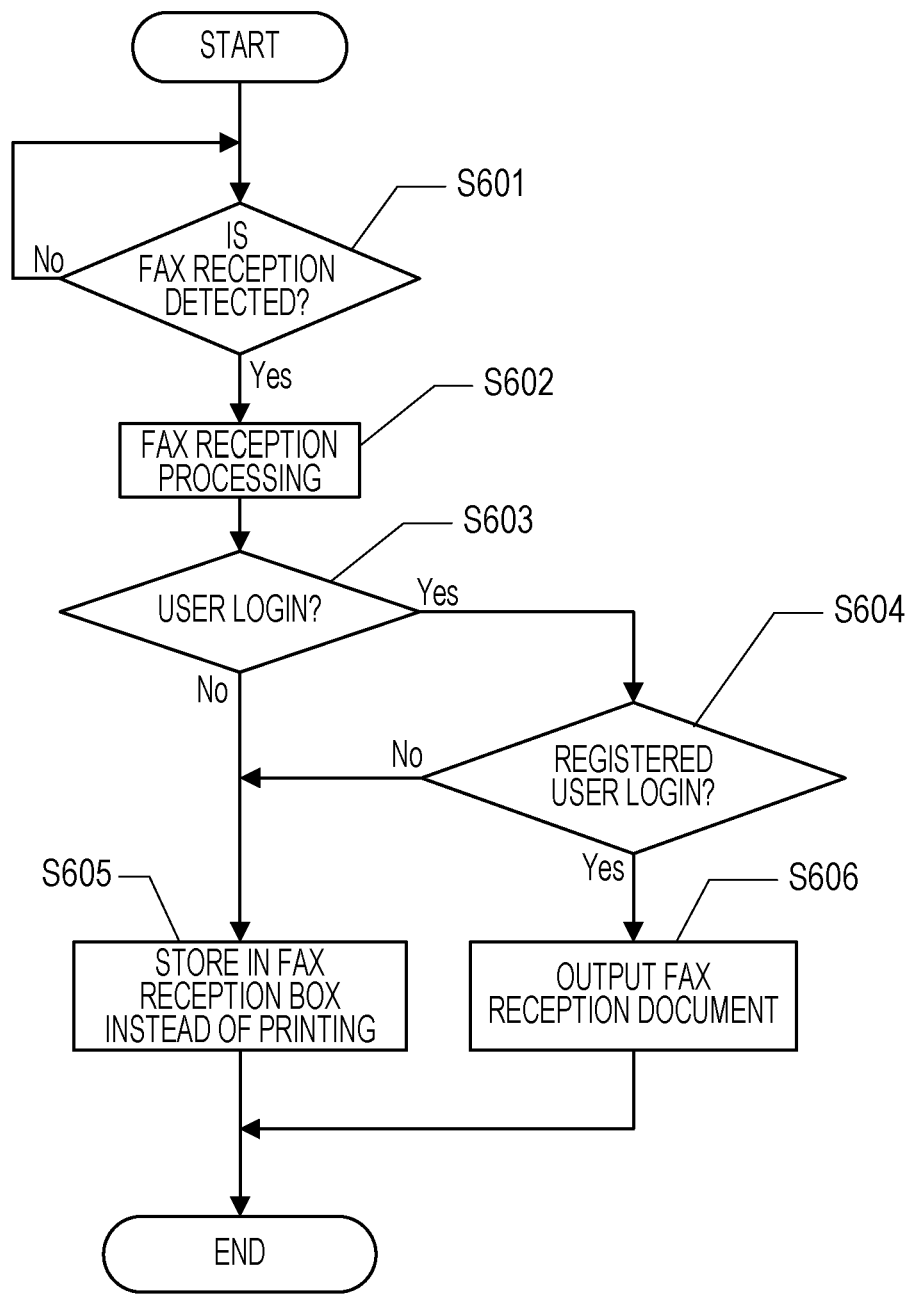
FIG. 6 is a flowchart illustrating a receiving flow of a facsimile-received document according to the present disclosure.

FIG. 6 illustrates a facsimile reception flow according to the present embodiment. This flow is implemented when the program stored on the DISK 211, such as a hard disk, is loaded into the memory 202 and executed by the CPU 201 as necessary.

Step S601 indicates a reception standby state of a facsimile. If reception of a facsimile is detected, the process proceeds to step S602, and if no reception of a facsimile is detected, the process remains in step S601.

In step S602, analog signals are converted into digital signals through the MODEM 109, and image data is stored in the memory 202 or on the DISK 211.

In step S603, login state determination is performed to determine whether a user is logged in. If it is determined that no user is logged in, the process proceeds to step S605 and if it is determined that a user is logged in, the process proceeds to step S604.

In step S605, a facsimile-received document is stored in a facsimile reception box on the DISK 211 without being printed.

If a user is logged in, login state determination is performed to determine whether the login user is a registered user (an authenticated user) in step S604. If it is determined that the user is a registered user in step S604 (Yes), the process proceeds to step S606, where printing of the facsimile-received document is performed.

If it is determined in step S604 that a user other than a registered user (a guest user to be charged) is logged in, the process proceeds to step S605, where the facsimile-received document is stored in the facsimile reception box on the DISK 211 without being printed. After completion of the processing of step S605 or step S606, the processing of the flowchart is completed.

As described above, if no user is logged in or a guest user is logged in, a facsimile-received document is stored in the facsimile reception box. Then, in a state in which a registered user is not logged in, the facsimile-received document is not printed, which avoids exposure of information as a result of the facsimile-received document being viewed or removed.

Process Flow Upon Login

Figure 7:
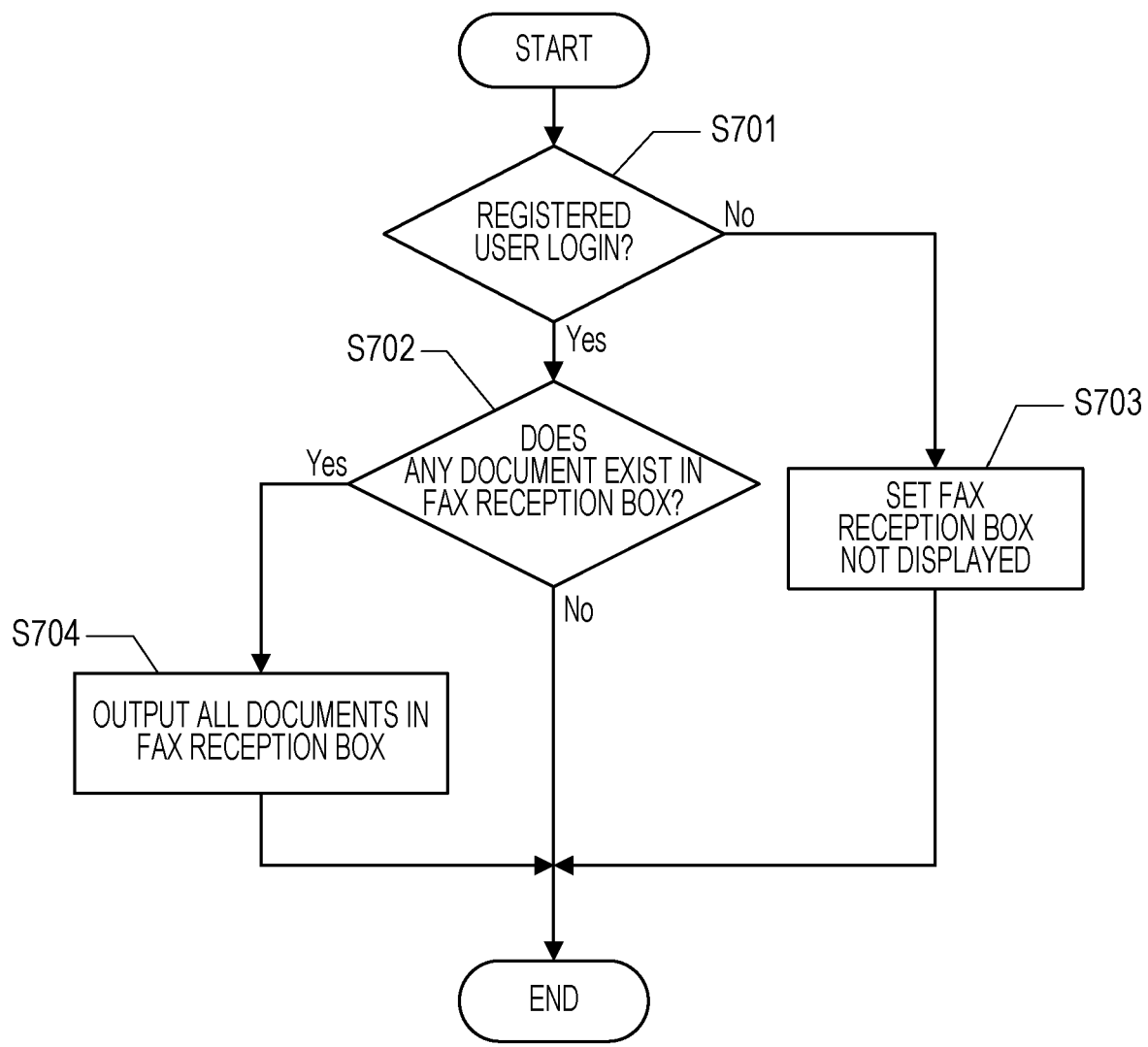
FIG. 7 is a flowchart illustrating a flow upon login according to the present disclosure.

FIG. 7 illustrates a process flow upon user login according to the present embodiment. In this process flow, a program stored on the DISK 211, such as a hard disk, is loaded into the memory 202 and executed on the CPU 201 as necessary.

In step S701, it is determined whether the login user is a registered user. That is, it is determined whether the ID input into the ID input box 502 and the password input into the password input box 503 of FIG. 5 are in agreement with the stored ID and the sored password. If these IDs and passwords are in agreement, it is determined that the login user is an authenticated registered user. If it is determined in step S701 that the login user is a registered user (Yes), the process proceeds to step S702.

In step S702, it is determined whether a facsimile-received document exists in the facsimile reception box. If it is determined that a facsimile-received document exists in the facsimile reception box in step S702 (Yes), the process proceeds to step S704.

In step S704, all of the facsimile-received documents in the facsimile reception box are output, and the processing of this flowchart is completed.

If it is determined that no facsimile-received document exists in the facsimile reception box in step S702 (No) the processing of this flowchart is completed.

If it is determined that the login user is other than a registered user in step S701 (No), the process proceeds to step S703. In step S703, the facsimile reception box is not displayed and the processing of this flowchart is completed.

As described above, according to the present embodiment, the facsimile-received document stored in the facsimile reception box is printed only when a registered user logs in, Therefore, failure in printing of the facsimile-received document by a registered user is avoided. The facsimile reception box is not displayed while a guest user is logged in, and the guest user cannot delete, print, and so forth the facsimile-received document. Therefore, manipulation and exposure of information can be avoided.

It has been possible to make only a specific user print a facsimile-received document by using a confidential function of the facsimile. However, in order to use the confidential function, since it is necessary to send a password from a sender to a receiver, convenience of the user may be impaired.

Then, in the present disclosure, since external users cannot access facsimile-received documents even if a confidential function of facsimile is not used, it becomes possible to easily improve security of facsimile-received documents, and convenience of the user in the office is improved.

Since users to be charged for printing using an image forming apparatus cannot view and print facsimile-received documents, exposure of confidential information can be avoided.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-182649, filed Sep. 20, 2016, which is hereby incorporated by reference herein in its entirety.

What is claimed is:

1. An image forming apparatus comprising:
a storage having a reception storage area;
one or more processors; and
a memory storing instructions that, when executed by the one or more processors, causes the image forming apparatus to function as:
a receiving unit configured to receive a facsimile-received document while a user is logged in to the image forming apparatus,
a first login state determination unit configured to determine whether the user has logged in to the image forming apparatus,
a second login state determination unit configured to determine whether the user who is determined to have logged in corresponds to a predetermined user identification (ID) which is to be verified with predetermined authentication information or the user who is determined to have logged in corresponds to another predetermined user ID which does not need verification with authentication information, and
a control unit configured to perform control,
wherein, in a case where the receiving unit receives the facsimile-received document and the second login state determination unit determines that the user who is determined to have logged in corresponds to the predetermined user ID which is to be verified with the predetermined authentication information, the control unit performs control to cause the facsimile-received document to be printed, and
wherein, in a case where the receiving unit receives the facsimile-received document and the second login state determination unit determines that the user who is determined to have logged in corresponds to the another predetermined user ID which does not need verification with authentication information, the control unit performs control to cause the storage to store the facsimile-received document in the reception storage area without printing the facsimile-received document.

2. The image forming apparatus according to claim 1, wherein, in a case where the first login state determination unit determines that a user to be charged a fee is logged in, the control unit performs control to prevent the reception storage area from being displayed.

3. The image forming apparatus according to claim 1, wherein, in a case where the receiving unit receives the facsimile-received document and the first login state determination unit determines that a user who does not need to be charged a fee is logged in, the control unit performs control to start printing of the received facsimile-received document.

4. The image forming apparatus according to claim 1, wherein, in a case where the first login state determination unit determines that a user who does not need to be charged a fee is logged in, the control unit performs control to start printing of the facsimile- received document stored in the reception storage area.

5. The image forming apparatus according to claim 1, wherein, in a case where a user inputs money into a charging device connected to the image forming apparatus, a user corresponding to the another predetermined user ID which does not need verification with authentication information is determined to have logged in to the image forming apparatus and a user corresponding to the another predetermined user ID is determined to have logged in to the image forming apparatus.

6. The image forming apparatus according to claim 5, wherein, in a case where the money input into the charging device is at least equal to a predetermined amount, input regarding a fee for printing by the user who inputs the money is verified.

7. The image forming apparatus according to claim 1, wherein, in a case where the receiving unit receives the facsimile-received document and the second login state determination unit determines that the user who is determined to have logged in corresponds to the predetermined user ID which is to be verified with the predetermined authentication information, the control unit performs control to cause the facsimile-received document to be printed.

8. The image forming apparatus according to claim 1, wherein, in a case where the receiving unit receives the facsimile-received document and the second login state determination unit determines that the user who is determined to have logged in corresponds to another predetermined user ID which is not assigned to authentication information, the control unit performs control to cause the storage to store the facsimile-received document in the reception storage area without printing the facsimile-received document, and
wherein, in a case where the receiving unit receives the facsimile-received document and the second login state determination unit determines that the user who is determined to have logged in corresponds to a predetermined user ID which is assigned to the predetermined authentication information, the control unit performs control to cause the facsimile-received document to be printed.

9. The image forming apparatus according to claim 1, wherein the another predetermined user ID which does not need verification with authentication information corresponds to a coin user ID for a coin user regarding a fee for printing by the coin user.

10. A method for an image forming apparatus having a storage that includes a reception storage area, the method comprising:
receiving a facsimile-received document while a user is logged in to the image forming apparatus;
determining, as a first login state, whether the user has logged in to the image forming apparatus;
determining, as a second login state, whether the user who is determined to have logged in corresponds to a predetermined user identification (ID) which is to be verified with predetermined authentication information or the user who is determined to have logged in corresponds to another predetermined user ID which does not need verification with authentication information; and
performing control,
wherein, in a case where receiving includes receiving the facsimile-received document and it is determined as the second login state that the user who is determined to have logged in corresponds to the predetermined user ID which is to be verified with the predetermined authentication information, performing control includes performing control to cause the facsimile-received document to be printed, and
wherein, in a case where receiving includes receiving the facsimile-received document and it is determined as the second login state that the user who is determined to have logged in corresponds to the another predetermined user ID which does not need verification with authentication information, performing control includes performing control to cause the storage to store the facsimile-received document in the reception storage area without printing the facsimile-received document.

\* \* \* \* \*